(12) United States Patent
Ellsworth (10) Patent No.: US 6,728,328 B1
(45) Date of Patent: Apr. 27, 2004

(54) SAFETY CONTROL CIRCUIT FOR A NEUTRONIC REACTOR

(75) Inventor: Howard C. Ellsworth, Richland, WA (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 0 days.

(21) Appl. No.: 03/429,712

(22) Filed: May 13, 1954

(51) Int. Cl.[7] .............................................. G21C 9/027
(52) U.S. Cl. ........................ 376/277; 376/327; 376/338
(58) Field of Search .............................. 317/36, 38, 37, 317/60, 137, 139, 141; 309/23, 38, 39, 40, 41; 204/154.2; 376/277

(56) References Cited

U.S. PATENT DOCUMENTS

| | | | |
|---|---|---|---|
| 1,173,569 A | * 2/1916 | Harris | ........................ 361/109 |
| 1,714,722 A | * 5/1929 | Moss | ........................ 361/109 |
| 2,385,219 A | * 9/1945 | McConnell | .................. 361/67 |
| 2,708,656 A | * 5/1955 | Firmi et al. | .................. 376/381 |
| 2,735,811 A | * 2/1956 | Weinberg et al. | ........... 376/221 |
| 6,226,341 B1 | * 5/2001 | Strand | ........................ 376/338 |

* cited by examiner

Primary Examiner—Michael J. Carone
Assistant Examiner—Daniel R. Matz
(74) Attorney, Agent, or Firm—Robert A. Fisher; Paul A. Gottlieb (57) ABSTRACT

A neutronic reactor comprising an active portion containing material fissionable by neutrons of thermal energy, means to control a neutronic chain reaction within the reactor comprising a safety device and a regulating device, a safety device including means defining a vertical channel extending into the reactor from an aperture in the upper surface of the reactor, a rod containing neutron-absorbing materials slidably disposed within the channel, means for maintaining the safety rod in a withdrawn position relative to the active portion of the reactor including means for releasing said rod on actuation thereof, a hopper mounted above the active portion of the reactor having a door disposed at the bottom of the hopper opening into the vertical channel, a plurality of bodies of neutron-absorbing materials disposed within the hopper, and means responsive to the failure of the safety rod on actuation thereof to enter the active portion of the reactor for opening the door in the hopper.

10 Claims, 6 Drawing Sheets

SAFETY CONTROL CIRCUIT FOR A NEUTRONIC REACTOR

This invention relates generally to neutronic reactors, and more specifically to electric control circuits controlling the operation of safety devices for preventing neutronic chain reactors from exceeding safe operating limits.

All neutronic reactors are constructed with as much excess reactivity as is possible considering the available reactor control system, the excess reactivity of a neutronic reactor being defined as the amount that the reproduction ratio of a neutronic reactor under most favorable conditions exceeds unity. The reproduction ratio of a neutronic reactor is the ratio of the number of neutrons in any given generation to the number of neutrons in the preceding generation within the actual pile structure. The excess reactivity of a neutronic reactor determines the magnitude of isotope production and other neutron-absorbing activities which the reactor may accomplish, and also determines the flexibility which is possible in operating the reactor.

The existence of excess reactivity in a reactor makes desirable both regulating control means and safety control means for the reactor. Regulating control means are necessary in order to maintain the reproduction ratio of the reactor at unity during constant power operation, and to make adjustments in the power level of the reactor. Safety control means are desirable in order to shut down the reactor more rapidly when unsafe operating conditions develop than is possible with the regulating control means.

There are many causes of unsafe operating conditions which make it desirable to shut down a neutronic reactor. If the reactor "period" becomes too short for any reason, it is desirable to shut down the reactor, the reactor period being the time required for the neutron flux density within the reactor to increase by a factor of e, or 2.718. In those reactors which employ cooling means and operate at substantial power levels, it is also desirable to shut down the reaction if there is a decrease in the flow of the coolant. There are also many other reasons for providing a safety control system to shut down a neutronic reactor, and the safety control system may be coupled to any of these dangerous conditions.

A number of safety control systems have been developed in the neutronic reactor art. In one of these systems, neutron-absorbing rods are disposed within channels which extend into the active portion of the reactor, the active portion being the region of the reactor in which the fissionable material is disposed. The rods of neutron-absorbing materials are mechanically biased to enter the active portion of the reactor when released, either by the attraction of gravity or some impelling force. This invention pertains in particular to the safety system disclosed in a copending U.S. patent application Ser. No. 413,735 of common assignee filed Mar. 2, 1954 in the name of Albert T. Strand.

An object of the present invention is to provide a safety system which provides two separate safety operations, the failure of one operation actuating the second operation, thereby greatly reducing the probability of a failure of the safety system.

Another object of the present invention is to provide a simple but accurately responsive control circuit for controlling the safety system.

A further object of the present invention is to provide a control circuit which will function reliably without being dependent on physical contact with the rest of the safety system.

Further objects and advantages of the present invention will be readily apparent to the person skilled in the art from a further reading of this specification, particularly when viewed in the light of the drawings, in which:

The reactor illustrated in the figures has an active portion 20 which may be defined as the region of the reactor containing the fissionable material. The active portion 20 is disposed within a reflector 22, and comprises a cube 24 of graphite which serves as a moderator, and a plurality of fuel elements 26 disposed within the cube 24. Channels 28 extend horizontally through the cube 24 parallel to each other, and tubes 30 are disposed within the channels 28. The fuel elements 26 are disposed within the tubes 30 on ribs 32 which are provided on the interior surface of the tubes 30. The fuel elements 26 are provided with corrosion resistant jackets 34, and the annulus 35 between the jackets 34 of the fuel elements 26 and the tubes 30 contains water which is pressurized and circulated to remove heat of the neutronic reaction from the reactor.

The reflector 22 is also constructed of graphite and is in the form of a hollow cube which surrounds the cube 24. In order to indicate the reflector 22 on FIG. 1, a dotted line has been used to separate it from the active portion 20. It is to be noted that the cube 24 effectively defines the active portion 20 of the reactor.

A shield 36 surrounds the reflector 22, and it is constructed of a plurality of layers 38 and 40. The layers 38 are constructed of iron, and the layers 40 are constructed of masonite, the layers 38 and 40 alternating throughout the shield 36 as taught in the patent application of Eugene P. Wigner and Gale J. Young, entitled "Shield", Ser. No. 595,184, filed May 22, 1945.

The reactor is provided with vertical channels 42 and horizontal channels 43. Neutron-absorbing, rods 46a and 46b are slidably disposed within the channels 42 and 43, and are used to control the neutronic chain reaction. The rods 46a are used as regulating control elements and are translatable in the horizontal channels 43, while other rods 46b are used as safety control elements and are translatable in the vertical channels 42. Regulating elements are positioned within the reactor to maintain the, reproduction ratio of the reactor at unity when a constant power level is desired, or positioned to change the power level. Safety elements are withdrawn from the active portion of a reactor and maintained in stand-by condition during operation of the reactor, so that they may be rapidly inserted into the reactor to shut down the reaction in the event an unsafe condition develops, or in the event it is desired to shut down the reaction rapidly for some other reason. A third type of control element called a shim control element is often provided in order to restrict the reactor excess reactivity to a value which may be controlled by the regulating rods in the normal course of operation, and is illustrated as a translatable horizontal rod 46c in FIG. 1.

Considering first the mechanical features of the safety system shown in FIGS. 1 through 11, hoppers 48 are disposed about safety rods 46b immediately exterior to the reactor shield 36. A sleeve 50 is closely fitted to the exterior surface of the rod 46b and forms a gas barrier between the active portion 20 of the reactor and the ambient atmosphere.

The upper end of the rod 46b is provided with a connector 52 which is connected to a cable 53 or some other means for positioning the safety rod 46b. The connector 52 is also provided with a member 54 which contacts the actuating members 55 of a pair of limit switches 56. As shown in FIG. 4, the lower portion of the connector 52 has a surface 58 which strikes against a shock-absorbing mechanism 60 when the rod 46b is permitted to drop into the active portion 20 of the reactor. The mechanism 60 has a frame 62 supported by springs 64 which extend between the frame 62 and a base 66, illustrated in FIGS. 3 and 4.

Each hopper 48 is essentially cylindrical in cross-section having an outer wall 68 and an inner wall of smaller radius 70. A portion of the region between the outer wall 68 and the inner wall 70 contains relatively small balls 72 of neutron-absorbing material.

The region between the outer and inner walls 68 and 70 of the hopper 48 is provided with a floor 74 which slopes downwardly in both directions from a line 75 traversing the cylindrical walls 68 and 70 through the axis of the hopper 48. Apertures 76 and 78 are provided in the floor 74 at the lowest points thereof, so that the balls 72 may be conveyed by gravitational attraction from the region between the outer wall 66 and the inner wall 70. A pair of chutes 80 and 82 extend from the apertures 76 and 78 inwardly toward the channel 42 of the reactor. These chutes 80 and 82 terminate on opposite sides of the safety rod 46b. A sleeve 83 is attached to the hopper 48 and extends about the rod 46b through the shield 36. The sleeve 83 is provided with spiral fins 84 which spiral downwardly into the channel 42 of the reactor. The inner wall 70 extends below the outer wall 68 to form a housing 86 which is disposed between the reactor and the hopper 48. The housing 86 also encloses the two chutes 80 and 82 and forms an air-tight seal between the reactor and the hopper 48. Trap doors 88 and 90 are mounted upon pins 92 and 94 adjacent to the apertures 76 and 78, and the doors 88 and 90 may be opened by rotation of the pins 92 and 94, thereby permitting the balls 72 to tumble down the chutes 80 and 82 into the spirally grooved channel. The housing 86 is also provided with a pair of outlets 96 and 98 on opposite sides thereof which are connected into the chutes 80 and 82. A second pair of rotatable doors 100 and 102 are mounted upon pins 104 and 106 at the junction of the outlets 96 and 98 and the chutes 80 and 82. The rotatable doors 100 and 102 are shaped to close the chutes 80 and 82 when rotated to a position within the chutes, shown in dotted lines in FIG. 3, and to cover approximately two-thirds of the opening to the outlets 96 and 98 when rotated to the position shown in solid lines in FIG. 3. The rotatable doors 88 and 90 are provided with recesses 108 and 110 which are aligned with recesses 112 and 114 in the rotatable doors 100 and 102, so that rotation of the doors 88 and 90 to the open position aligns these doors with doors 100 and 102 when the latter doors are positioned out of the chutes 80 and 82 and partially close the outlets 96 and 98.

Since radiation may escape through the shield 36 of the reactor by means of the channel 42, the voids in the housing 86 have been filled with shielding materials 113, such as concrete. Also, the balls 72 of neutron-absorbing material aid in reducing the amount of radiation escaping from the active portion 20 of the reactor through the channel 42. In this connection, it is necessary to seal the atmosphere within the reactor from the ambient atmosphere, since bombardment of the materials in the reactor and the reactor atmosphere produce radioactive isotopes which would constitute a health hazard if permitted to escape to the ambient atmosphere. For these reasons, seals between the housing 86 and the reactor shield 36, designated 115, are provided, and the housing itself seals the regions between the inner wall 70 and the outer wall 66 from the ambient atmosphere.

A protective sleeve 116 surrounds the spiral fins 84 of the sleeve 83 in abutting relationship and protects the shield 36 from any abrasive action of the balls 72 as they travel into the channel 42.

Figures 3, 8, 9, 10:
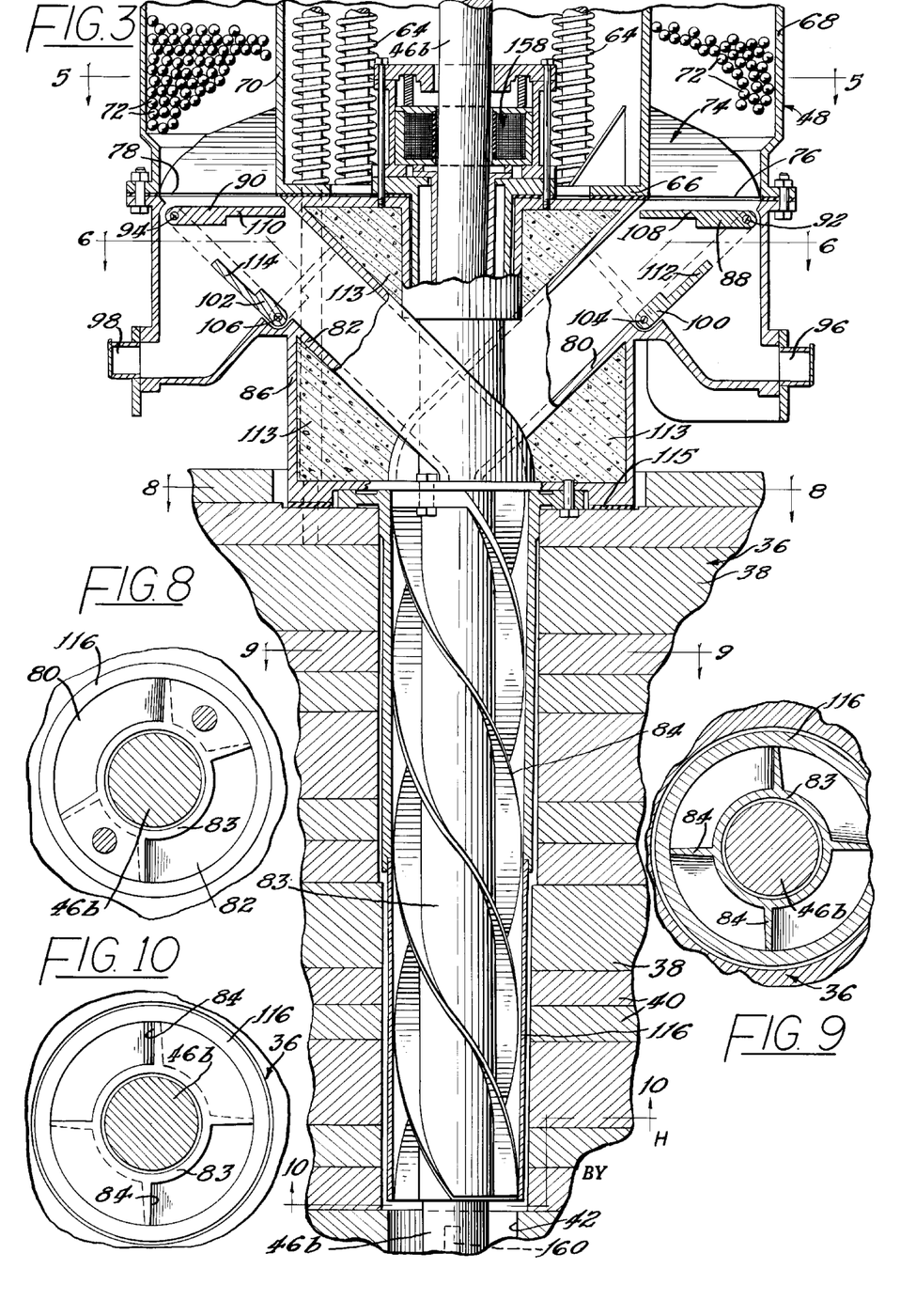
FIG. 3 is a vertical sectional view of the portion of the safety system shown in FIGS. 1 and 2.
FIG. 8 is a sectional view taken along line 8—8 of FIG. 3.
FIG. 9 is a sectional view taken along line 9—9 of FIG. 3.
FIG. 10 is a sectional view taken along line 10—10 of FIG. 3.
Figures 4, 11:
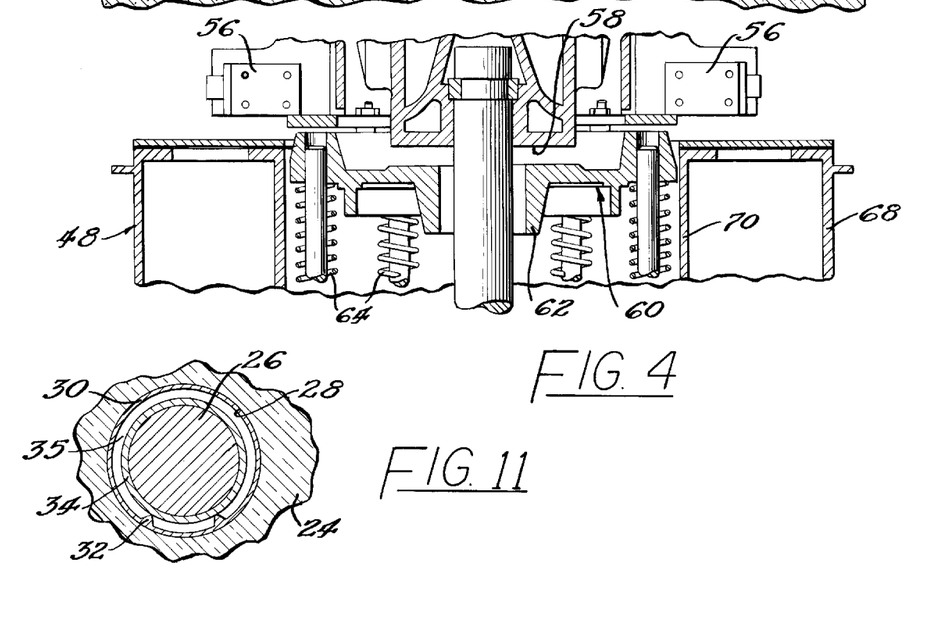
FIG. 4 is a vertical sectional view of another portion of the safety system shown in FIG. 3.
FIG. 11 is an enlarged sectional view of one of the tubes traversing the reactor shown in FIG. 1.
Figures 5, 6, 7:
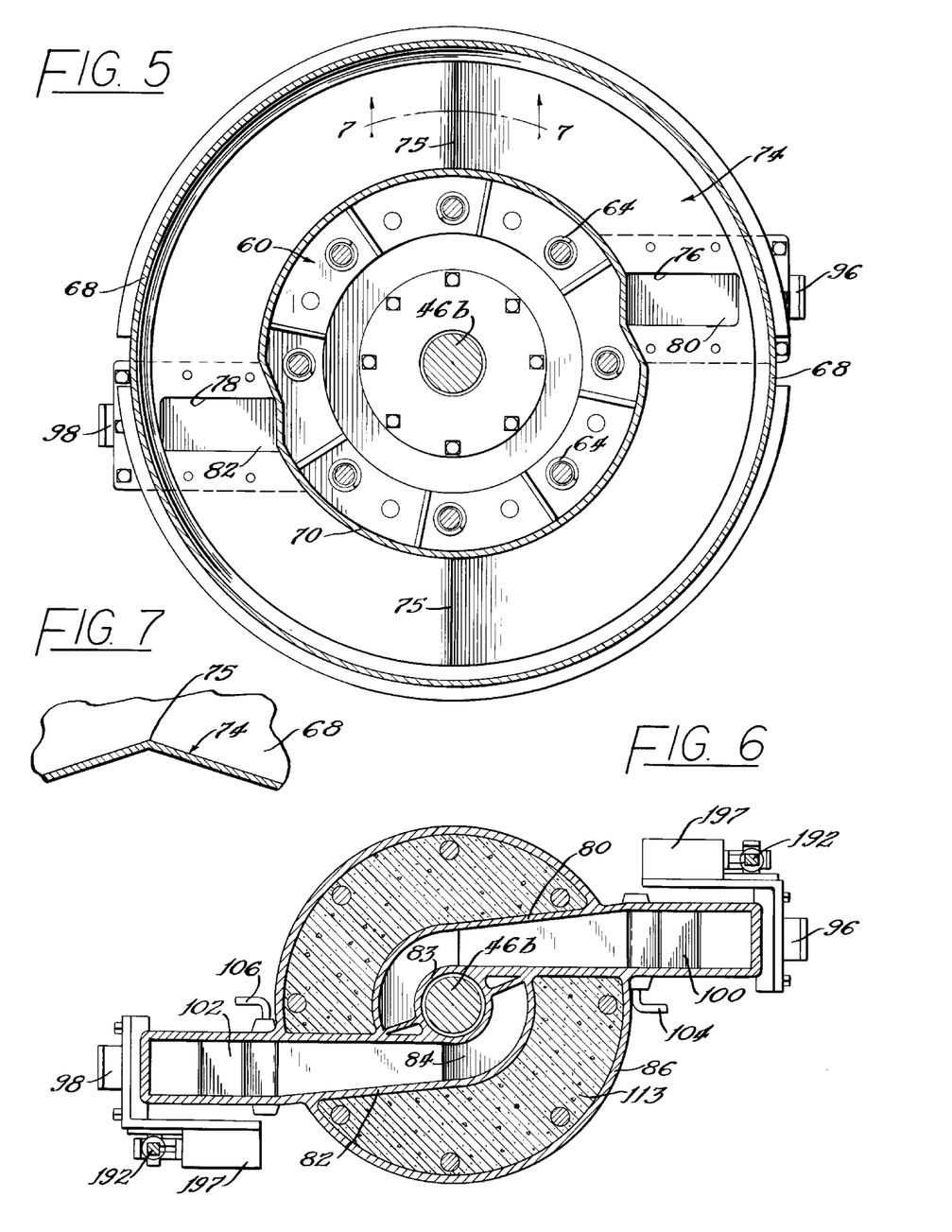
FIG. 5 is a horizontal sectional view taken along line 5—5 of FIG. 3.
FIG. 6 is a horizontal sectional view taken along line 6—6 of FIG. 3.
FIG. 7 is a sectional view taken along line 7—7 of FIG. 5.

The operation of the safety mechanism may be described assuming the doors 88, 90, 100, and 102 are in the positions shown by solid lines in FIG. 3, and with reference to only one safety rod 46b, although it will be understood that a reactor usually has a plurality of rods 46b. If it is desired to shut down the neutronic reactor, an effort is first made to insert the safety rod 46b into the active portion 20 of the reactor. If the safety rod 46b fails to enter the active portion 20 of the reactor for any reason whatever, then the trap doors 88 and 90 are lowered by rotation of the pins 92 and 94, thereby permitting the balls 72 to flow through the chutes 80 and 82 past the spiral fins 84, which prevent the balls 72 from jamming in the channel 42, and into the active portion 20 of the reactor through the channel 42. Once in the active portion 20 of the reactor, the balls 72 perform the same function that the safety rod 46b would have performed had it entered the active portion 20 of the reactor. The balls 72 may be removed from the active portion 20 of the reactor by any means whatsoever. One method of removing the balls from the reactor would be to provide an exit at the bottom of the channel 42 and remove the balls therethrough, such as plugged duets 117 illustrated in FIG. 1. Another method of removing the balls would be to suck the balls upwardly through the channels 42 by means of a vacuum system.

Most unsafe conditions which require the operation of a reactor safety system require prompt attention, and the jamming of the safety rod 46b must result in the opening of the doors 88 and 90 in a minimum of time. It is therefore desirable to have an automatic device which opens the trap doors 88 and 90 in the event that the safety rod 46b fails to enter the reactor active portion 20. An electrical device for accomplishing automatic actuation of the trap doors 88 and 90 is shown schematically in FIG. 13 and will be described hereinafter.

In a particular embodiment of the invention, the cube 24 of graphite and reflector 22 are constructed of graphite having a diffusion length for thermal neutrons of approximately 50 centimeters and measuring over-all 36 feet by 36 feet by 26 feet high. Tubes 30 are constructed of aluminum and spaced eight and three-eighths inches apart, the tubes extending through the active portion 20 and reflector 22 of the reactor parallel to each other and parallel to four of the sides of the reactor. The reflector 22 is approximately two feet thick in all directions, the portions of the reflector being traversed by the tubes 30 as well as all other portions of the reflector containing no fissionable material.

The fuel elements 26 of the reactor contain natural uranium disposed within cylindrical jackets approximately 0.028 inch thick and having an outside diameter of approximately 1.440 inches, the inside diameter of the tubes 30 being approximately 1.611 inches, thus leaving an annular space for flow of water coolant that is approximately 0.086 inch wide. The reactor may be operated at a power level of 250,000 kw., in which case the flow of water through the cooling annulus of each tube is about 19.5 feet per second, the water entering the reactor at a temperature of approximately 20° C. and being discharged from the reactor at a temperature of approximately 70° C. The thickness of the aluminum tubes 30 is approximately 0.059 inch, the outside diameter of the aluminum tube 30 being approximately 1.729 inches. All in all, the reactor is provided with 2,004 cooling tubes, the 1,500 cooling tubes centrally located within the graphite cube 24 at a minimum being filled with fuel elements 26, thus forming essentially a cylindrical active portion. This corresponds to a loading of about 200 short tons of natural uranium.

The reactor is provided with twenty-nine safety rods 46$b$ which are held in a releasable mariner above the active portion 20 of the reactor and which drop into the reactor active portion 20 in two to two and one-half seconds after being released. The safety rods 46$b$ are in the form of hollow steel tubes containing one and one-half percent boron and have a diameter of two and one-half inches, a length of thirty-five feet, and a wall thickness of three-sixteenths inch. The sleeves 50 within the channels are constructed of aluminum and have an inner diameter just slightly larger than the diameter of the safety rods 46$b$. The vertical channels 42 for the safety rods 46$b$ traverse the center volume of the active portion 20 of the reactor And are essentially equally spaced.

The balls 72 may be constructed of any material having a neutron capture cross-section of at least one hundred barns. Boron, cadmium, gadolinium and xenon have suitable neutron capture cross-sections and can be fabricated into the form of a ball. In the particular embodiment described the balls 72 have a diameter of three-eighth inch plus or minus 0.010 inch. The surface of the balls is coated with a 0.0002 inch thick coating of nickel. The balls themselves contain the following composition:

| Elements | % |
| --- | --- |
| Carbon | 0.055–0.075 |
| Manganese | 0.20 maximum |
| Silicon | 0.50–0.70 |
| Phosphorus and sulphur | 0.025 maximum |
| Boron | 1.50–1.70 |
| Iron | remainder |

There should be enough balls 72 disposed in each hopper 48 to provide an equivalent amount of boron in the reactor to that which would be disposed in the active portion of the reactor 20 if the safety rod 46$b$ associated with the hopper were positioned within the active portion 20 of the reactor.

In the particular construction of the reactor here described, nine horizontal regulating and shim rods have been provided and are positioned to slide into the central portion of the active portion 20 of the reactor. These rods are equally spaced and contain materials having neutron capture cross-sections of at least one hundred barns, such as boron, cadmium and gadolinium. The safety rods 46$b$ described above contain suitable proportions of boron for use as regulating rods 46$a$ or shim rods 46$c$.

The mechanical features of the safety system described thus far are being claimed in the patent application Ser. No. 413,735 of Albert T. Strand, filed Mar. 2, 1954.

As previously stated, it is desirable to release the neutron-absorbing balls 72 automatically if the safety rod 46$b$ fails to enter the active portion 20 of the reactor. The mechanical portion of the safety system illustrated in FIGS. 1 through 11 is provided with a coil 158 (FIG. 3) disposed within the inner wall 70 of the hopper 48. The safety rod 46$b$ is provided with means for producing a magnetic field such as a permanent magnet 160. In this particular embodiment, the permanent magnet 160 is located in the bottom portion of the safety rod 46$b$. The permanent magnet 160 cooperates with the coil 158 to produce an electrical pulse whenever the safety rod 146$b$ is released from its vertical suspension.

Figure 12:
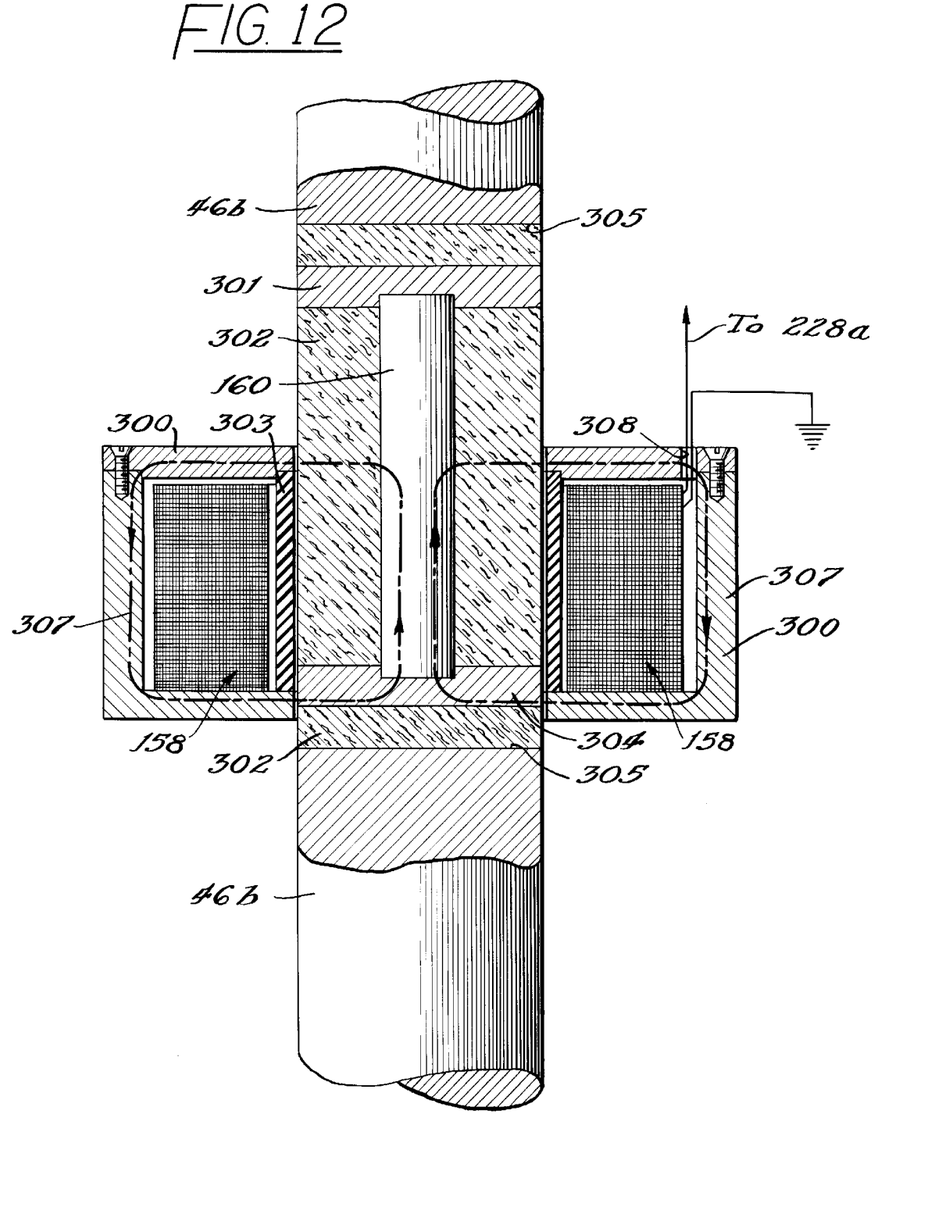
FIG. 12 is a vertical sectional view of a pulse generating means, constituting a portion of the device of FIG. 3, used in the control circuit shown in FIG. 13, with the parts shown in the course of generating a pulse.

Referring to FIG. 12, the coil 158 is mounted within a housing 300 made preferably from soft iron. The coil 150 is protected from abrasion as well as from displacement within the housing 300 by means of a sleeve 303 Which presents a smooth path for the rod 46$b$ to fall through the circular opening within the housing 300. As was indicated above, the rod 46$b$ is a cylinder fabricated from steel having a certain percentage of boron. Since the combination of the coil 158 and the permanent magnet 160 would not operate effectively if the latter was enclosed in a ferro-magnetic sleeve, such as the rod 46$b$, the rod 46$b$ is attached at the point 305 to a section 302 containing the permanent magnet 160. The magnetic assembly comprises the magnet 160 concentrically mounted within the mass 302, which is preferably made from non-magnetic insulator material, a pair of pole pieces 301 and 304, preferably made of soft iron, which pole pieces are mounted individually on each end of the permanent magnet 160. The length of the permanent magnet 160 need not correspond to the height of the soft iron housing 300. The embedding mass 302 may be secured to the rod 46$b$ at the junction point 305 by any suitable means such as threading, using screws, or by press-fitting. The output of the pulse generating coil 158 is sinusoidal in nature. One peak of the output is reached when the pole piece 304, in descending through the opening in the housing 300, assumes a position approximately midway between the outer extremities of the coil 158. As the pole piece 304 leaves the central portion of the coil 158 and emerges through the lower opening in the housing 300, the magnitude of the induced voltage wave shape decreases and passes through a reference zero position and then begins to increase in the opposite polarity direction as soon as the pole piece 301 begins to enter the region within the coil 158. The maximum voltage wave is reached in the opposite polarity region when the pole piece 301 occupies a position approximately in the middle of the coil 158. The voltage wave then continues to decrease to zero as the pole piece 301 recedes from the coil cavity. The flux path established by the descending magnetic assembly and the housing 300 around the coil 158 is indicated by the lines 307. The leads from the coil 158 are brought out through an opening 308; one of the leads being connected to ground and the other connected to a rectifier, such as 228$a$.

When the rod 46$b$ enters the active portion 20 of the reactor, the magnet 160 passes through the coil 158 at a sufficient velocity to create an electric pulse in the coil 158. This pulse may be used to prevent the doors 88 and 90 of the hopper 48 from opening and releasing the neutron-absorbing balls 72 into the channel 28 of the reactor active portion 20.

Figure 1:
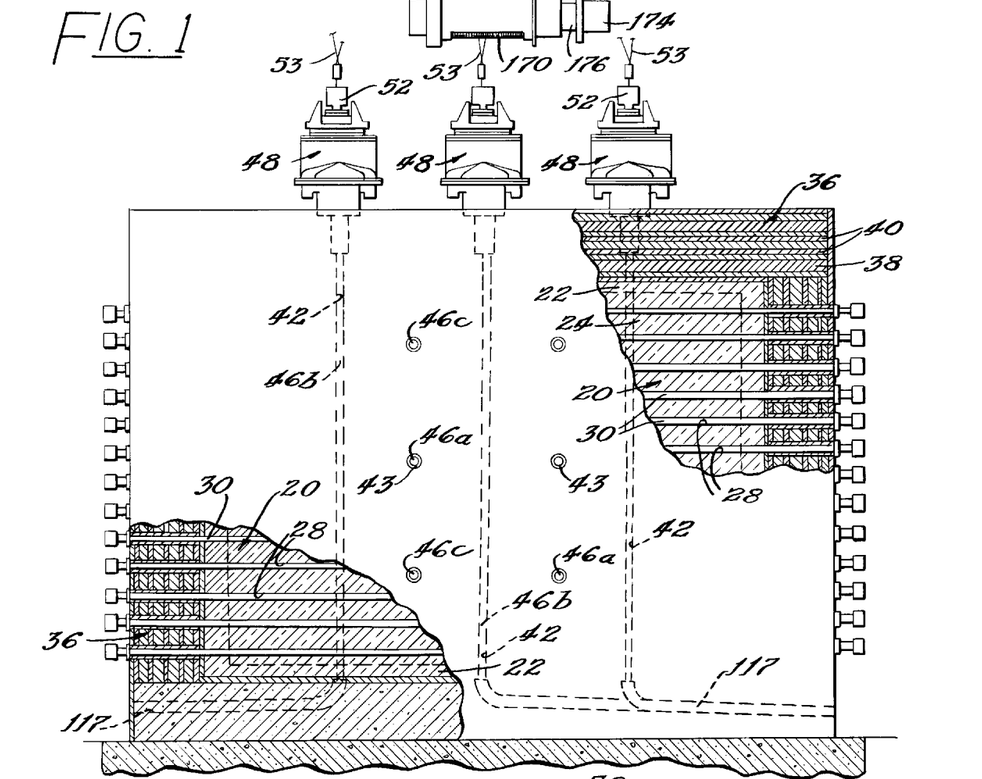
FIG. 1 is an elevational view, partly in section, of a neutronic reactor provided with a safety control system embodying the teachings of the present invention.
Figure 13:
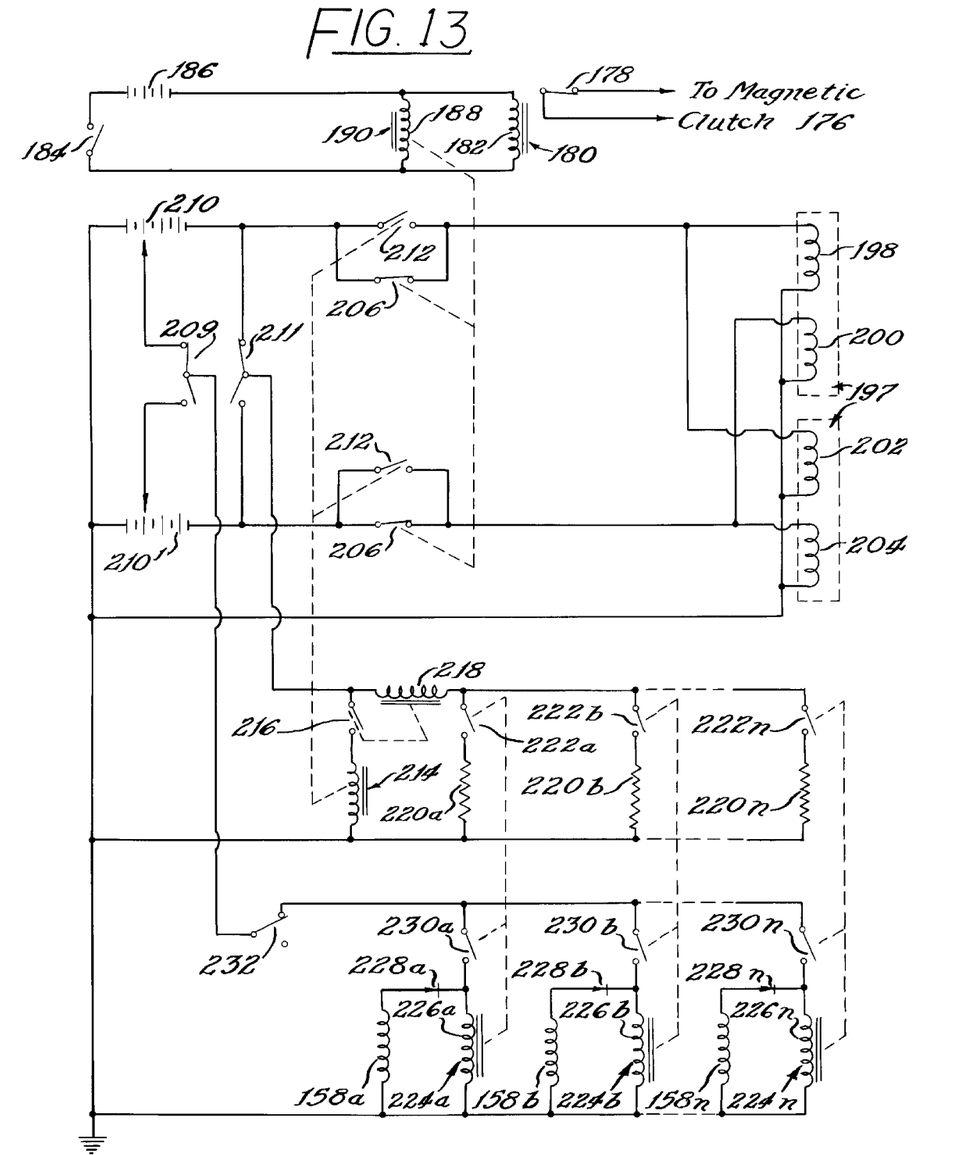
FIG. 13 is a schematic diagram illustrating the electrical system for controlling the safety systems shown in FIGS. 1 through 11.

The electrical circuit used to open the doors 88 and 90 of the hoppers 48 is shown in FIG. 13. It is to be understood that the circuit shown in FIG. 13 is for control of a single hopper of the reactor and that duplicate circuits must be arranged for the other hoppers. As illustrated in FIG. 1, the safety rods 46b are suspended from a winch 170 mounted above the reactor by means of double cables 53, the winch 170 having two portions winding in opposite directions. A motor 174 is coupled to the winch 170 through a magnetic clutch 176. The magnetic clutch 176 requires an electric current to be flowing through the coils thereof in order to maintain coupling between the motor 174 and the winch 170. When the electrical power is removed from the magnetic clutch 176, the winch 170 is free to rotate and the safety rods 46b are free to fall into the active portion of the reactor.

As shown in FIG. 13, the power to the magnetic clutch 176 passes through the contacts 178 of relay 180 which maintains the contacts 178 in a closed position in the absence of power being applied to the relay coil 182. The coil 182 of the relay 180 is connected in a series circuit with a switch 184 and a source of power 186. When the switch 184 is closed, the relay 180 opens its contacts 178 permitting the safety rods 46b to fall into the reactor. The coil 188 of ball release relay 190 is connected in parallel with the coil 182 of relay 180, so that closing switch 184 also actuates the relay 190. The relay 190 is used to control the trap doors of the ball hoppers 48, as will hereinafter be described.

Figure 2:
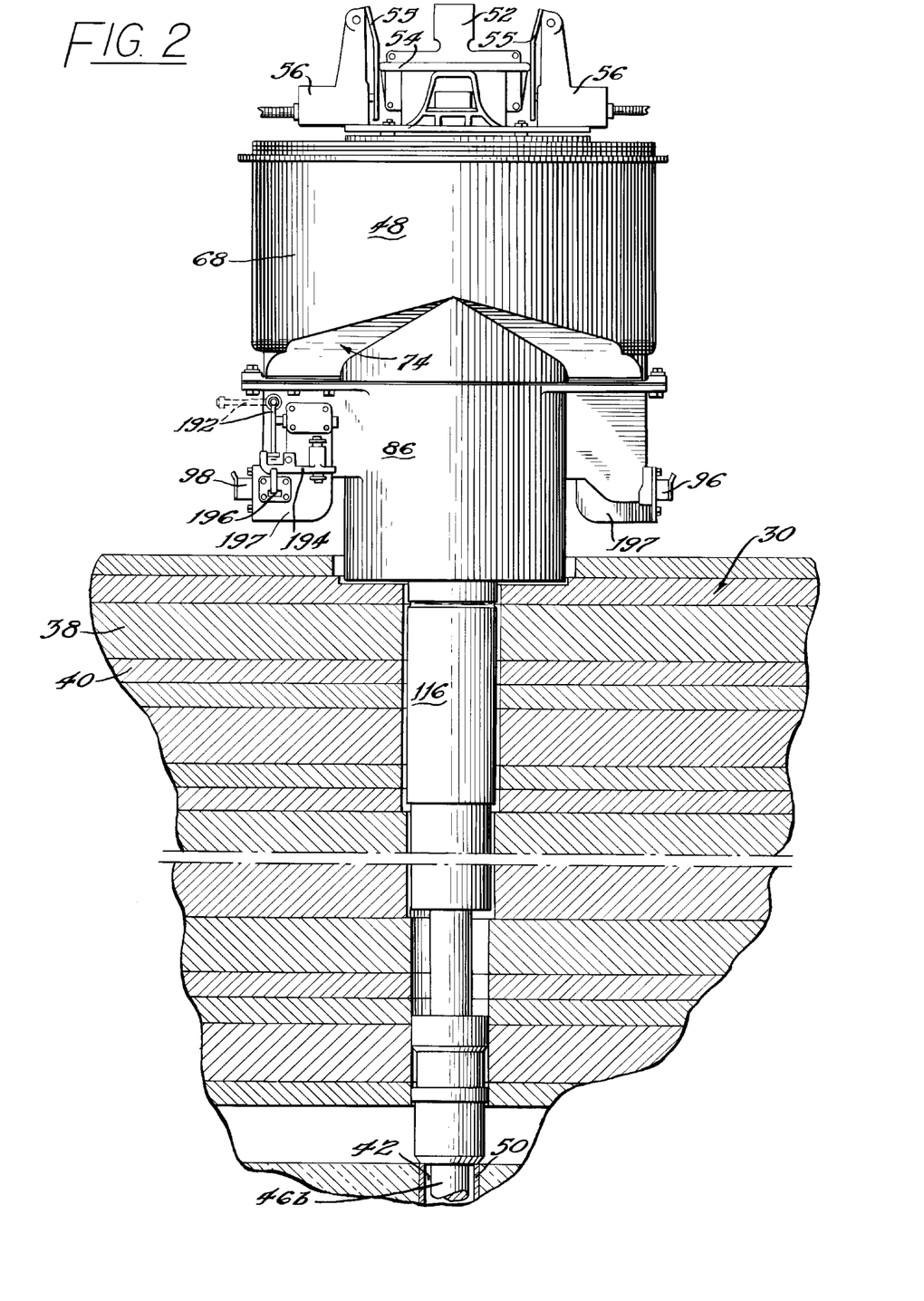
FIG. 2 is a vertical sectional view, partly in elevation showing a portion-of the safety system shown in FIG. 1 in enlarged form.

FIG. 2 shows that the trap doors 88 and 90 of the hopper 48 are attached to arms 192 by means of pins 92 and 94, respectively. When the arms 192 are secured in position by means of clamps 194, the trap doors 88 and 90 are in the closed position. The clamps 194 are maintained in position by locks 196 which are the movable elements of an electromagnetic relay 197. The coils 198 and 202 of relay 197 are shown in FIG. 13. If power through the coils 198 or 202 of the solenoid is disrupted, then the lock 196 will permit the clamp 194 to pivot outwardly releasing the arm 192 and opening the trap doors 88 and 90.

The ball safety release relay 190 is a time delay relay, the period of time delay being slightly longer than the time required for the rods 46b to enter into and stop within the active portion 20 of the reactor. The relay 190 has a pair of switch contacts 206. One set of contacts 206 is connected in series with a pair of coils 198 and 202 of the ball release solenoids 197 and the power source 210; and the other set of contacts 206 is connected in series with a pair of coils 200 and 204 and the power source 210$^1$. The ball release solenoids 197 are illustrated as double-duty solenoids, coils 198 and 202 forming one complete solenoid circuit and coils 200 and 204 forming the other solenoid circuit. The purpose of the dual nature of each solenoid 197 and its associated circuit is to assure a trouble-free operation of the reactor even if one set of coils becomes faulty or if either one of the power sources, such as 210 and 210$^1$, fail. An energizing circuit extends from the power source 210 to the coils 198 and 202 through the switch contacts 206 of the time delay relay 190 so that opening of the contacts 206 will result in the release of the balls 72 from the hopper 48 in the absence of functioning of other mechanism. Similarly, a circuit is established from the other power source 210$^1$ through the switch contacts 206 to the coils 200 and 204 over which an energizing current may flow. It is to be noted, that both sets of the contacts 206 must be opened by the time delay relay 190 if the ball release safety system is to operate satisfactorily because if either one of said contacts. 206 should remain closed, the dual nature of the solenoids 197, as explained before, will keep said ball release system inoperative. This is due to the two sets of coils on each solenoid, each coil being energized for a different source of power.

The release of the balls 72 into the hopper 43 is prevented by energizing the ball holding relay 214 which has a pair of switch contacts 212 connected in parallel with the switch contacts 206 of the relay 190, provided that the relay 214 is actuated within the period of time delay of relay 190. The ball holding relay 214 is operated whenever pulse integrating relay 218 operates to establish a circuit from one terminal of the source of power 210, contacts 211, contacts 216, and through the winding of the ball holding relay 214 to the other terminal of the power source 210. The pulse integrating relay 218 is a current sensitive relay and is connected to the source of power 210 in series with a plurality of parallel-connected resistors 220a, 220b . . . 220n through switch contacts 222a, 222b . . . 222n, where n is the number of switch contacts, there being one set of switch contacts and a resistor for each safety rod 46b of the reactor. The switch contacts 222a, 222b . . . 222n are associated with relays 224a, 224b . . . 224n. Each of the relays 224a, 224b . . . 224n has a coil 226a, 226b . . . 226n which is connected in a loop circuit with pulse generating coils 158a, 158b . . . 158n and rectifiers 228a, 228b . . . 228n. The relays 224a, 224b . . . 224n are also provided with switch contacts 230a, 230 b . . . 230n, the switch contacts 230a, 230b . . . 230n being connected in a series circuit with the source of power 210 and the coils 226a, 226b . . . 226n of the relays 224a, 224b . . . 224n. The relays 218 and 214 together with their associated components comprise the pulse integration system.

When the switch 184 is close to release the safety rods 46b, the rods 46b fall into the reactor causing the magnets 160 to traverse through the coils 153a, 158b . . . 158n. As a result of electromagnetic induction, pulses are set up in the relays 224a, 224b . . . 224n unless one or more of the safety rods 46b fails to fall sufficiently far into the active portion 20 of the reactor. All of the relays 224a, 224b . . . 224n which receive a pulse are actuated to close their associated contacts 230a, 230b . . . 230n and 222a, 222b . . . 222n. The closure of the contacts 230a, 230b . . . 230n establishes a lock circuit for each of the associated relays thereby preventing these relays from releasing after being energized by the individual pulses. A typical lock circuit for one of the relays, such as 224a, may be traced from one side of the power source 210, contacts of the switch 209; reset switch 232, contacts 230a and the winding on relay 224a to the other side of the power source 210. The reset switch 232 is connected in series with either the source of power 210 or 210$^1$ and the switch contacts 230a, 230b . . . 230n in order to de-energize relays 224a, 224b . . . 224n whenever necessary. The operation of the relays 224a, 224b . . . 224n also closes the switch contacts 222a, 222b . . . 222n to establish a plurality of parallel resistive circuits connected to the winding of the relay 218 so that a predetermined magnitude of current will flow through the relay 218 to actuate it and subsequently to actuate a relay 214. For example, the parallel circuit containing the resistor 220a is energized from one terminal of the source of power 210, contacts of the switch 211, winding on relay 218, contacts 222a, resistor 220a and back to the other terminal of the power source 210. Unless a sufficient number of relay contacts of the series 222a . . . 222n close, sufficient current will not flow through the relay 218 to close the contacts 216 thereby allowing the ball safety system to function and to release the balls 72 into the hopper 48. This is the desired result, since failure of a sufficient number of safety rods 46b to enter the reactor could prevent the stopping of the neutronic chain reaction in the absence of the release of the balls 72.

After the safety system comprising the safety rods 46b has operated to stop the reaction in a reactor, the control circuit is deenergized by the operation of the reset switch 232 which functions to open the lock circuits to the various pulse pick-up relays 224a, 224b . . . 224n. The release of the aforementioned pulse pick-up relays results in the opening up of the individual contacts associated with each relay thereby opening the energizing circuit to the current sensitive relay 218 which in turn releases the relay 214. The switches 209 and 211 make possible the use of either of the sources of powers 210 or $210^1$ should it ever occur that one of said power sources has failed.

As was indicated before, the time delay of the timing device is slightly longer than the time required for the safety rods to enter into the reactor. It is well known in the art that a certain time will elapse before a reactor will reach a critical stage when running away out of control beyond its regular operating level. This critical time element depends on the geometry of the reactor as well as other numerous factors. The time delay period chosen, within which the second safety system described hereinbefore will operate, is but a small percent of the critical time element thereby presenting a large safety factor. In the present embodiment, the total time element comprises (1) time delay period preset on the relay, (2) the time required to operate the time delay relay and to open the trap doors in the bins, and (3) the time required for the balls to fall into the control rod cavity. Since the entire safety system is designed to operate with a large safety factor, the time delay relay may be set within certain limits without undue criticality as to its operational sensitivity.

From the foregoing disclosure, a person skilled in the art will readily devise many other devices and modifications similar in nature to those disclosed herein. Hence, it is intended that the scope of the present invention be not limited to the specific device or circuit here disclosed, but rather only by the appended claims.

What is claimed is:

1. In a control circuit for controlling a reactor safety means comprising two safety systems interlocked by the control circuit, the second of said systems operable responsive to the failure of the first safety system to shut down the operation of the reactor, the improved construction comprising means to initiate the operation of the second system after a predetermined interval of time, a pulse integrating means, generating means associated with said first system to produce pulses, and means for transmitting said pulses to said pulse integrating means to totalize the pulses, said pulse integrating system responsive to a particular number of said pulses to inactivate said initiating means thereby rendering said second system inoperable due to the operation of said first system.

2. The control circuit as described in claim 1 wherein the pulse generating means comprises a plurality of pulse generator coils and permanent magnets, and the transmission means comprises a plurality of pulse pick-up coils and rectifiers, each of said pulse generating coils and magnets associated with one of said rectifiers and pulse pick-up coils to form a loop circuit, each of said loop circuits responsive to a pulse to effect control over said pulse integrating means.

3. The control circuit as claimed in claim 1 wherein the pulse generating means comprises a housing constructed of paramagnetic material provided with an aperture extending therethrough, a coil of wire disposed about the periphery of the aperture, a rod slidably disposed within the aperture having a pair of spaced pole pieces constructed of paramagnetic material, a permanent magnet axially disposed within the rod and between said pole pieces and adapted to engage the pole pieces.

4. In a control circuit for controlling a reactor safety means, said safety means comprising two separate systems interlocked by the control circuit, the second of said systems being operable only upon the failure of the first system, the improved construction comprising means in said second system including a plurality of contacts to initiate the shutdown of the reactor after a predetermined period of time, said first system comprising a plurality of pulse generating devices, a plurality of pulse pick-up coils, each of said pulse pick-up coils associated with a pulse generating device, a pulse integrating means comprising a current sensitive relay including a plurality of circuits connected thereto, and a ball holding relay having a plurality of contacts adapted to shunt the contacts of said time delay relay, each of said pulse generating devices responsive to the initiation of said first safety system to close one of said current circuits to overpass an increment of current through said current sensitive relay, said current sensitive relay responsive to the receipt of a predetermined number of current increments to control the operation of said ball holding relay to shunt the contacts of said time delay relay thereby removing effective control of said second system over said reactor.

5. The control-circuit as claimed in claim 4 wherein each of the pulse generating devices comprises an electromagnetic coil having an internal circular cavity passing therethrough, a pair of spaced pole pieces, and a permanent magnet terminating in the pole pieces and mounted in an insulating and non-magnetic medium, said medium slidably disposed within the cavity of said iron-clad coil to produce an electrical pulse within said coil through electromagnetic induction.

6. In a safety control means for a neutronic reactor, comprising, in combination, a plurality of vertical safety rods and a ball safety system, the improvement comprising an interlock between said vertical rods and said ball safety system, said interlock comprising a ball release timing relay including a set of contacts to initiate the shutdown of the reactor, the timing cycle of said relay being initiated by release of said vertical rods, a ball holding relay having contacts shunting the timing relay contacts, and a pulse integrating means which comprises a plurality of pulse generating means and a plurality of pulse pick-up relays, each of said pulse generating means being actuated by the entrance of a particular vertical safety rod into the reactor to control its associated pulse pick-up relay, and a pulse integrating relay including a set of contacts responsive to the operation of a predetermined number of said pulse pick-up relays to operate the ball holding relay to shunt the control of said ball release relay thereby preventing the operation of the ball safety system, provided that the pulse integrating relay is closed before the end of the timing cycle of said ball release timing relay.

7. In a safety control means for a neutronic reactor, comprising, in combination, a first safety system including a plurality of individual elements and a second safety system, the improvement comprising an interlock between said first safety system and said second safety system, said interlock comprising a second safety release timing relay to initiate the shutdown of the reactor, the timing cycle of said relay being initiated by the release of said elements, and a pulse integrating system comprising a plurality of pulse generating means, a plurality of pulse pick-up relays, each of said pulse generating means responsive to the entry of an associated element into the reactor to operate its associated pick-up relay, a pulse integrating relay including a plurality of parallel circuits connected thereto, each of said circuits controlled by one of said pulse pick-up relays, and a second safety system holding relay adapted to inactivate the timing relay, the pulse integrating relay responsive to the operation of a predetermined number of pulse pick-up relays to actuate said holding relay thereby rendering inoperative the time delay relay.

8. The control circuit as claimed in claim 7 wherein the safety control system includes a plurality of solenoids adapted to effect the operation of the second safety system, said time delay relay and said pulse integration system exerting individual controls over said solenoids, said time delay relay responsive after a predetermined period to control said solenoids to actuate said second safety system provided that a requisite number of elements failed to enter into the reactor to operate said pulse integrating relay.

9. In a control circuit for controlling a reactor safety means comprising two safety systems interlocked by the control circuit, the second of said safety systems operable responsive to the failure of the first safety system to shut down the operation of the reactor, the improved construction comprising means to initiate the operation of the second system after a predetermined interval of time, means in the first system having control over said initiating means, said control means responsive to operation of the first system to inactivate the initiating means thereby rendering said second system inoperable due to the operation of said first system.

10. In a control circuit for controlling a reactor safety means comprising two safety systems interlocked by the control circuit, the first safety system comprising a plurality of elements and adapted to shut down the operation of the reactor with a certain number of said elements, the second of said safety systems operable responsive to operational failure of said certain number of elements to shut down the operation of the reactor, the improved construction comprising means to initiate the operation of the second system after a predetermined interval of time, means in the first system having control over said initiating means, said control means responsive to operation of the first system to inactivate the initiating means thereby rendering said second system inoperable due to the operation of said first system.

* * * * *